(12) United States Patent
Buenger et al.

(10) Patent No.: US 11,260,631 B2
(45) Date of Patent: Mar. 1, 2022

(54) MULTILAYER POLYURETHANE PROTECTIVE FILMS

(71) Applicant: DESIGN BLUE LTD., Croydon (GB)

(72) Inventors: Daniel Buenger, Aachen (DE); Iason Zografou, Aachen (DE)

(73) Assignee: Design Blue Ltd., Croydon (GB)

( * ) Notice: Subject to any disclaimer, the term of this patent is extended or adjusted under 35 U.S.C. 154(b) by 264 days.

(21) Appl. No.: 15/142,695

(22) Filed: Apr. 29, 2016

(65) Prior Publication Data

US 2016/0318289 A1  Nov. 3, 2016

(30) Foreign Application Priority Data

Apr. 30, 2015 (EP) ..................... 15166010

(51) Int. Cl.
  *C09J 183/04* (2006.01)
  *C09J 7/29* (2018.01)
  (Continued)

(52) U.S. Cl.
  CPC .............. *B32B 27/08* (2013.01); *B29C 65/48* (2013.01); *B29C 65/4825* (2013.01);
  (Continued)

(58) Field of Classification Search
  None
  See application file for complete search history.

(56) References Cited

U.S. PATENT DOCUMENTS 6,383,644 B2 * 5/2002 Fuchs ..................... B32B 27/40
                                                          428/424.8
9,040,648 B2 * 5/2015 Hickenboth ......... C08G 18/671
                                                          428/446
(Continued)

FOREIGN PATENT DOCUMENTS

JP    2008539107 A    11/2008
JP    2010505663 A     2/2010
(Continued)

OTHER PUBLICATIONS

Chinese Office Action dated Mar. 3, 2020 for App. No. 2016-090236.

*Primary Examiner* — Frank D Ducheneaux
(74) *Attorney, Agent, or Firm* — Ryan T. Grace; Advent, LLP

(57) ABSTRACT

The present invention relates to multilayer films used to protect a surface, in particular, to such films used to protect surfaces of articles e.g., mobile electronics display protections, smartphones, tablets), industrial touch screens (e.g. machine interfaces), UV stable surfaces and glass protections for machine housings and cockpits (e.g. caterpillars, dumpers), etc.), and, more particularly, to such a multilayer protective film backed by a silicone-based pressure sensitive adhesive (PSA) and having either an aliphatic polyurethane layer or an aliphatic thermoplastic polyurethane layer on top of an aliphatic thermoplastic polyurethane layer, where the two aliphatic polyurethane layers have different physical and/or chemical properties. The present invention also relates to an article that is protected by the multilayer film as well as a method for making the multilayer protective film.

11 Claims, 1 Drawing Sheet

(51) Int. Cl.
  *C09J 7/38* (2018.01)
  *B32B 27/08* (2006.01)
  *B32B 27/40* (2006.01)
  *B32B 5/02* (2006.01)
  *B32B 7/12* (2006.01)
  *B32B 27/36* (2006.01)
  *B32B 7/06* (2019.01)
  *B29C 65/48* (2006.01)
  *B32B 27/28* (2006.01)
  *B32B 37/12* (2006.01)
  *B29C 65/00* (2006.01)
  *B29K 675/00* (2006.01)
  *B29K 683/00* (2006.01)
  *B32B 27/12* (2006.01)

(52) U.S. Cl.
  CPC ............ *B29C 66/71* (2013.01); *B32B 27/283* (2013.01); *B32B 27/40* (2013.01); *B32B 37/12* (2013.01); *C09J 7/29* (2018.01); *C09J 7/38* (2018.01); *C09J 183/04* (2013.01); *B29K 2675/00* (2013.01); *B29K 2683/00* (2013.01); *B32B 5/02* (2013.01); *B32B 7/06* (2013.01); *B32B 7/12* (2013.01); *B32B 27/12* (2013.01); *B32B 27/36* (2013.01); *B32B 2250/03* (2013.01); *B32B 2250/04* (2013.01); *B32B 2250/05* (2013.01); *B32B 2250/24* (2013.01); *B32B 2255/10* (2013.01); *B32B 2262/0276* (2013.01); *B32B 2307/41* (2013.01); *B32B 2307/412* (2013.01); *B32B 2307/414* (2013.01); *B32B 2307/732* (2013.01); *B32B 2307/748* (2013.01); *B32B 2375/00* (2013.01); *B32B 2383/00* (2013.01); *B32B 2405/00* (2013.01); *B32B 2457/00* (2013.01); *B32B 2571/00* (2013.01); *C09J 2475/006* (2013.01); *C09J 2483/00* (2013.01)

(56) References Cited

U.S. PATENT DOCUMENTS

| | | | |
|---|---|---|---|
| 2002/0034598 A1* | 3/2002 | Bonk | C08G 18/4238 428/36.6 |
| 2005/0255771 A1 | 11/2005 | Chetty et al. | |
| 2009/0145541 A1* | 6/2009 | Xiao | B32B 15/06 156/249 |
| 2010/0160545 A1* | 6/2010 | Page | C08G 18/4277 524/589 |
| 2012/0160402 A1* | 6/2012 | Ho | B32B 27/40 156/222 |
| 2015/0224750 A1* | 8/2015 | Visioli | B32B 27/08 428/95 |
| 2017/0218226 A1* | 8/2017 | Ho | B29C 48/022 |

FOREIGN PATENT DOCUMENTS

| | | |
|---|---|---|
| KR | 20090064560 A | 6/2009 |
| WO | 9413496 A1 | 6/1994 |
| WO | 0027900 A1 | 5/2000 |
| WO | 2011112817 A1 | 9/2011 |

* cited by examiner

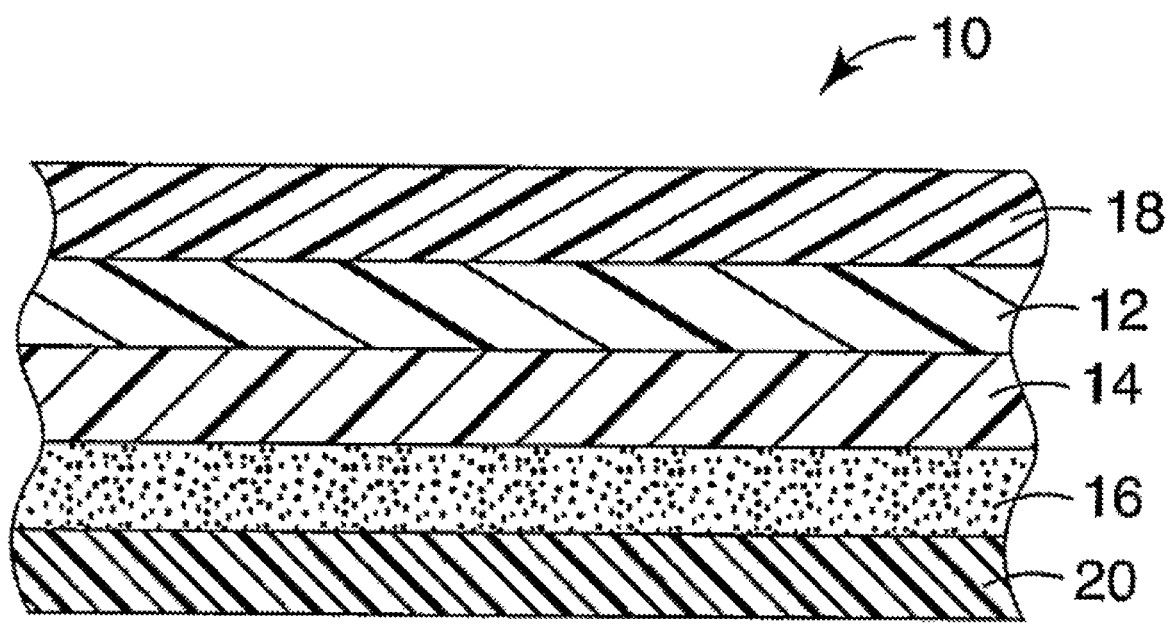

MULTILAYER POLYURETHANE PROTECTIVE FILMS

BACKGROUND

Technical Field

The present invention relates to multilayer films used to protect a surface, in particular, to such films used to protect surfaces of articles e.g., mobile electronics display protections, smartphones, tablets), industrial touch screens (e.g. machine interfaces), UV stable surfaces and glass protections for machine housings and cockpits (e.g. caterpillars, dumpers), etc.), and, more particularly, to such a multilayer protective film backed by a silicone-based pressure sensitive adhesive (PSA) and having either an aliphatic polyurethane layer or an aliphatic thermoplastic polyurethane layer on top of an aliphatic thermoplastic polyurethane layer, where the two aliphatic polyurethane layers have different physical and/or chemical properties. The present invention also relates to an article that is protected by the multilayer film as well as a method for making the multilayer protective film.

Background Art

Multilayer films that include one or more layers of a polyurethane material are known. Some of these films are disclosed in U.S. Pat. Nos. 6,607,831, 5,405,675, 5,468,532 and 6,383,644 as well as International (PCT) Patent Application No. PCT/EP93/01294 (i.e., Publication No. WO 93/24551). Some of these films have been used in surface protection applications. For example, actual film products that have been used to protect the painted surface of selected automobile body parts include multilayer films manufactured by 3M Company, St. Paul, Minn., under the product designations Scotchcal™ high performance protective film PUL0612, PUL1212 and PUL1212DC.

Each of these 3M Company film products includes a thermoplastic polyester polyurethane layer that is backed by a pressure sensitive adhesive (PSA) on one major surface and covered by a water-based polyester polyurethane layer on the opposite major surface.

The present invention is an improvement in such multilayer protective film technology.

SUMMARY DISCLOSURE

In accordance with one aspect of the present invention, a multilayer protective film is provided that comprises a first layer, a second layer and a silicone-based PSA layer. The first layer consists of, consists primarily of, or at least comprises either
a) a solvent-based or water-based aliphatic polyurethane selected from a polyester-based polyurethane, a polycarbonate-based polyurethane or a combination or blend thereof; or
b) a polycaprolactone-based thermoplastic aliphatic polyurethane, a polyester-based thermoplastic aliphatic polyurethane, a polyether-based thermoplastic aliphatic polyurethane or combination thereof.

The second layer consists of, consists primarily of, or at least comprises a polyester-based thermoplastic aliphatic polyurethane, polyether-based thermoplastic aliphatic polyurethane or polycaprolactone-based thermoplastic aliphatic polyurethane having different physical and/or chemical properties than the thermoplastic aliphatic polyurethane of the first layer. The PSA layer comprises a silicone-based pressure sensitive adhesive. One major surface of the first layer is bonded to one major surface of the second layer, and the PSA layer is bonded to an opposite major surface of the second layer such that the second layer is sandwiched between the first layer and the PSA layer.

It can be desirable for the aliphatic polyurethane used in the first layer to be at least a slightly crosslinked polyurethane but not a heavily crosslinked or thermoset polyurethane. The aliphatic polyurethane can be a reaction product of constituents comprising one or more aliphatic polyols and one or more aliphatic diisocyanates. Preferably, a mixture of one or more aliphatic diisocyanates and one or more aliphatic triisocyanates is used. Improved performance has been obtained by using aliphatic materials in the present multilayer film. A film according to the present invention can be sized and shaped to conform to a two- or three-dimensional surface e.g. of a curved display.

In accordance with another aspect of the present invention, articles such as mobile electronics display protections (smartphones, tablets), industrial touch screens (e.g. machine interfaces), UV stable surfaces and glass protections for machine housings and cockpits (e.g. caterpillars, dumpers) etc. are provided that have a surface protected by a multilayer protective film as described herein. In accordance with a further aspect of the present invention, a method of making a multilayer protective film is provided. The method comprises (a) forming a first layer; (b) forming a second layer; (c) forming a PSA layer comprising a silicone-based pressure sensitive adhesive; (d) bonding one major surface of the first layer to one major surface of the second layer; and (e) bonding the PSA layer to an opposite major surface of the second layer.

In detail, the above method can be carried out according to the following non-limiting alternatives:

Alternative 1:
1. Coating of an aliphatic Polyurethane (PU) on a carrier web
2. Extrusion of the aliphatic TPU on a carrier web
3. Lamination of 1 and 2
4. Si-PSA coating on carrier web
5. Lamination with lamination product of 1 and 2

Alternative 2:
1. Extrusion of the aliphatic TPU on a carrier web
2. Coating of an aliphatic Polyurethane (PU) on the aliphatic TPU
3. Removing carrier web from the aliphatic TPU
4. Coating of Silicone based PSA on the backside of the aliphatic TPU Alternative 3:
1. Extrusion of the aliphatic TPU on a carrier web
2. Extrusion coating of an aliphatic TPU different from step 1 on the prior applied aliphatic TPU layer
3. Removing carrier web from the aliphatic TPU
4. Coating of Silicone based PSA on the backside of the aliphatic TPU Alternative 4:
1. Extrusion of the aliphatic TPU on a carrier web
2. Extrusion an aliphatic TPU different from 1 on a carrier web
3. Lamination of 1 and 2
4. Removing carrier web from the aliphatic TPU 1
5. Coating of Silicone based PSA on the backside of the aliphatic TPU 1

Alternative 5:
1. Co-Extrusion of two different aliphatic TPUs on a carrier web
2. Removing the carrier web 3. Coating of Silicone based PSA on the backside of the aliphatic TPU The silicone-based PSA can in each case be directly coated on aliphatic TPU or coated on a carrier web and then be laminated in a different step with aliphatic TPU.

The layers are bonded together so that the second layer is sandwiched between the first layer and the PSA layer. Accordingly, product 1 resulting from alternatives 1 and 2 has the following structure:
aliphatic PU
aliphatic TPU
Silicone based PSA Product 2 resulting from alternatives 3, 4 and 5 has the following structure:
aliphatic TPU
aliphatic TPU (different chemical and/or physical properties from first layer TPU)
Silicone based PSA Protective liners may be present on top and/or back of products 1 and 2.

The opposite major surface of the second layer can be corona treated beforehand to improve the bond with the PSA layer. Corona treatment can also be applied to improve the bond between PU and TPU layer or between TPU layers, respectively. The method step of forming the first layer can further comprise casting or otherwise coating an aqueous-based aliphatic polyurethane dispersion or a solvent-based aliphatic polyurethane solution onto a releasable carrier web or liner. The method step of forming the second layer can further comprise extruding the thermoplastic aliphatic polyurethane at an elevated temperature through a die to form the second layer. The method step of bonding the first layer to the second layer can also further comprise laminating the one major surface of the first layer to the one major surface of the second layer, after the second layer is extruded and while at least the one major surface of the second layer is, or both the second layer and the first layer are, at an elevated temperature that is sufficiently higher than room temperature to facilitate adequate bonding between the first layer and the second layer.

The method step of bonding the first layer to the second layer can alternatively comprise heating at least the one major surface of the second layer, at least the one major surface of the first layer, or the one major surface of both the first layer and the second layer to an elevated temperature and laminating the one major surface of the first layer to the one major surface of the second layer after the second layer is extruded, cast or coated onto a releasable liner, or otherwise formed. The heating can occur before and/or during the laminating. The elevated temperature is sufficiently higher than room temperature to facilitate adequate bonding between the first layer and the second layer during the laminating. This method of bonding can be useful when at least the one major surface of the first layer and the one major surface of the second layer are at about room temperature or at least at a temperature that is too low to facilitate adequate bonding between the first layer and the second layer.

Other features and advantages of the present invention will be apparent from the following description of embodiments thereof, and from the claims.

BRIEF DESCRIPTION OF DRAWINGS

FIG. 1 is a cross-sectional view of a multilayer film according to the present invention.

DETAILED DESCRIPTION OF EXEMPLARY EMBODIMENTS

Although the present invention is herein described in terms of specific embodiments, it will be readily apparent to those skilled in this art that various modifications, rearrangements, and substitutions can be made without departing from the spirit of the invention. A multilayer protective film, according to the present invention, comprises a first layer, a second layer and a silicone-based PSA layer. The first layer consists of, consists primarily of, or at least comprises either
a) a solvent-based or water-based aliphatic polyurethane selected from a polyester-based polyurethane, a polycarbonate-based polyurethane or a combination or blend thereof; or
b) a polycaprolactone-based thermoplastic aliphatic polyurethane, a polyester-based thermoplastic aliphatic polyurethane, a polyether-based thermoplastic aliphatic polyurethane or combination thereof.

The second layer consists of, consists primarily of, or at least comprises a polyester-based thermoplastic aliphatic polyurethane, a polyether-based thermoplastic aliphatic polyurethane or a polycaprolactone-based thermoplastic aliphatic polyurethane having different physical and/or chemical properties than the thermoplastic aliphatic polyurethane of the first layer. The PSA layer comprises a silicone-based pressure sensitive adhesive. The water-based aliphatic polyurethane can be made from an aqueous-based aliphatic polyurethane dispersion (i.e., PUD), and the solvent-based aliphatic polyurethane can be made from a solvent-based aliphatic polyurethane solution (i.e., PUS). It can be preferable to use PUDs, because of the elimination of the volatile solvents typically associated with using PUSs. The TPU layer consists of, consists primarily of, or at least comprises a polycaprolactone-based aliphatic TPU (i.e., thermoplastic polyurethane). The PSA layer comprises a silicone-based pressure sensitive adhesive. The aliphatic PU layer is bonded to one major surface of the aliphatic TPU layer and the silicone-based PSA layer is bonded to an opposite major surface of the aliphatic TPU layer such that the aliphatic TPU layer is sandwiched between the aliphatic PU layer and the PSA layer.

Superior results have been obtained with a multilayer film, according to the present invention, that includes an aliphatic PUD layer that uses a polycarbonate-based polyurethane or a polyester-based polyurethane. It is believed that superior results would likewise be obtained with an aliphatic PUS layer that uses a polycarbonate-based polyurethane or a polyester-based polyurethane. It has also been found that an aliphatic PUD layer that uses a polycarbonate-based polyurethane exhibits results that are superior to those obtained with an aliphatic PUD layer that uses a polyester-based polyurethane. It is believed that superior results would likewise be obtained with an aliphatic PUS layer that uses a polycarbonate-based polyurethane as compared to an aliphatic PUS layer that uses a polyester-based polyurethane. The aliphatic polyurethane can be the reaction product of one or more aliphatic polyol segments and one or more aliphatic diisocyanate segments. It is desirable for one or more aliphatic triisocyanate segments to be used with the aliphatic diisocyanate. It has been found desirable to use up to about 10%, based on the total weight of the reaction components, of aliphatic triisocyanate segments with the aliphatic diisocyanate. The aliphatic polyol is a polyester polyol, a polycarbonate polyol or a combination of both. Superior results have been obtained using a polycarbonate polyol. It has also been found desirable to use an aliphatic diisocyanate such as, for example, isophorone diisocyanate, bis (4-isocyanato-cyclohexyl) methane or a combination of both.

Improved performance has been obtained by using aliphatic materials in the present multilayer films. It is believed that improved performance would likewise be obtained by using aliphatic materials in a solvent-based system. Superior results have been obtained, for example, using an aliphatic polycarbonate polyol in a PUD layer. It is believed that superior results would also be obtained, for example, using an aliphatic polycarbonate polyol in a PUS layer.

It has been found that it can be desirable for the present multilayer film to use an aliphatic polyurethane that is at least a slightly crosslinked polyurethane but not a thermoset polyurethane. As used herein, a slightly crosslinked polyurethane is one that can exhibit at least enough melting or at least enough softening, when heated to a sufficiently high temperature, to form a bond that is strong enough to adhere when a layer of the polyurethane is laminated to a layer of the thermoplastic polyurethane. In contrast, as used herein, a thermoset polyurethane is one that is so heavily crosslinked that it does not exhibit a sufficient amount of melting or softening when heated. That is, a thermoset polyurethane will generally burn rather than melt or soften and would not form a bond that is strong enough to adhere when a layer of the thermoset polyurethane is laminated to a layer of the thermoplastic polyurethane, even when the thermoplastic polyurethane is heated before it is laminated.

The present inventive multilayer film is typically transparent, and possibly even translucent, for paint protection applications. The present inventive multilayer film may also be transparent, translucent or even opaque for other surface protection or enhancement applications. For some applications, it may be desirable for the present multilayer film to be colored. The present film could be colored such as, for example, by one or more of its layers further comprising a pigment or other coloring agent. When used, for example, as a paint protection film, it has been desirable for the present multilayer film to be sized and shaped to conform to the surface to be protected, before the film is applied. Pre-sized and shaped pieces of the present multilayer film can be commercially desirable for articles, such as mobile electronics display protections (smartphones, tablets), industrial touch screens (e.g. machine interfaces), UV stable surface and glass protections for machine housings and cockpits (e.g. caterpillars, dumpers), etc. Most commercially used PSAs, including acrylics, rubber-based and epoxies, are based on organic chemistry. However, for applications where excellent performance at high temperatures and resistance to chemicals, moisture, weathering and UV is required, silicone-based PSAs are preferred. Silicone PSAs have good conformability, can be cleanly removed and show excellent adhesion to low-energy surfaces. Due to their basic chemistry, they exhibit exceptional electrical insulating properties and provide some degree of sound and vibration dampening. Because they can withstand high temperatures and chemical attack, silicone PSAs are useful in applications such as plasma, flame spray and electronic circuit board masking tape, where conventional, organic-based PSAs are unable to perform satisfactorily. Their high-temperature performance also makes silicone PSAs suitable for use in powder coating applications, and their electrical properties make them suitable for tapes used in circuit assembly and EMI shielding. Further, their ability to adhere to low-energy surfaces makes silicone PSAs suitable for use as splicing tapes for silicone coated release liners.

The multilayer protective films according to the present invention are highly weatherproof and UV-resistant.

There are two major modifications of making a multilayer protective film according to the present invention:

Modification A:

A method of making a multilayer protective film, according to the present invention comprises: (a) forming an aliphatic TPU layer on a carrier web, (b) forming an aliphatic PU, or aliphatic TPU layer on the first TPU layer, with the two TPU layers having different physical and/or chemical properties, (c) removing the carrier web from the first aliphatic TPU layer, (d) coating or otherwise applying a Silicone based PSA on the aliphatic TPU surface which was first protected by the carrier web.

The first aliphatic TPU layer can be formed by extruding the polycaprolactone-based aliphatic TPU (i.e., aliphatic thermoplastic polyurethane) at an elevated temperature through an extrusion die. The aliphatic TPU layer may also be formed by casting or otherwise molding (e.g., injection molding) the polycaprolactone-based aliphatic TPU into the shape desired.

According to the present invention, the aliphatic PU layer may be formed using conventional practices such as, for example, by the aqueous dispersion or solvent solution mixture being cast or otherwise coated directly onto the aliphatic TPU layer, or alternatively onto a releasable carrier web or liner.

According to the present invention, the second aliphatic TPU layer may be formed using conventional techniques such as, for example, extrusion coating the polycaprolactone-based aliphatic TPU (i.e., aliphatic thermoplastic polyurethane) at an elevated temperature through an extrusion die onto the first aliphatic TPU layer. The second aliphatic TPU layer may also be formed by casting, solvent casting, or otherwise molding (e.g., injection molding) the polycaprolactone-based aliphatic TPU into the shape desired.

According to the present invention, the silicone-based PSA layer may be formed using conventional practices such as, for example, by solvent solution mixture being cast or otherwise coated directly onto the aliphatic TPU layer, or alternatively onto a releasable carrier web or liner.

To facilitate or at least improve bonding between the aliphatic PU layer, the aliphatic TPU layer and the silicone-based PSA layer it can be desirable to corona treat (e.g., air or $N_2$ corona treatment). To accomplish this, the major surface of the aliphatic TPU layer, which is not in contact with the aliphatic PU layer, is exposed and then corona treated. If a hot laminating process is used (i.e., the aliphatic TPU layer is extruded onto a releasable carrier web or liner), the carrier web or liner must first be stripped off of the aliphatic TPU layer.

Modification B:

A method of making a multilayer protective film, according to the present invention comprises: (a) forming a first or aliphatic PU layer; (b) forming a second or aliphatic TPU layer; (c) forming a silicone-based PSA layer; (d) bonding one major surface of the aliphatic PU layer to one major surface of the aliphatic TPU layer; and (e) bonding the silicone-based PSA layer (e.g., by corona treating and thermally laminating, coating or otherwise applying the pressure sensitive adhesive so as to adhere) to an opposite major surface of the aliphatic TPU layer, with the aliphatic TPU layer being sandwiched between the aliphatic PU layer and the silicone-based PSA layer. The aliphatic PU layer can consist of, consists primarily of or at least comprises an aliphatic polyurethane made from an aqueous-based aliphatic polyurethane dispersion (i.e., PUD) or an aliphatic polyurethane made from a solvent-based aliphatic polyurethane solution. The aliphatic polyurethane can be a polyester-based polyurethane, a polycarbonate-based polyurethane or a combination of both. The aliphatic TPU layer consists of, consists primarily of or at least comprises a polycaprolactone-based aliphatic TPU (i.e., thermoplastic polyurethane). The PSA layer comprises a pressure sensitive silicone adhesive.

According to the present invention, the aliphatic PU layer may be formed using conventional practices such as, for example, by the aqueous dispersion or solvent solution mixture being cast or otherwise coated onto a releasable carrier web or liner.

Those skilled in the art are capable of casting or otherwise coating the aqueous dispersion or solvent solution mixture of the present invention onto a releasable carrier web using known techniques. Suitable carriers may include films such as biaxially oriented polyester and papers that may be coated or printed with a composition that will enable release from the polyurethane compositions. Such coatings include those formed from polyacrylics, silicone, and fluorochemicals. The aqueous dispersion or solvent solution mixture can be coated onto a carrier web using conventional equipment known by those skilled in the art such as knife coater, roll coaters, reverse roll coaters, notched bar coaters, curtain coaters, roto-gravure coaters, rotary printer and the like. The viscosity of the aqueous or solvent mixture can be adjusted to the type of coater used. The water or solvent in the coated mixture is then removed such as, for example, by drying.

The aliphatic PU layer can be formed, for example, by casting or otherwise coating an aliphatic aqueous PUD (i.e., aliphatic polyurethane dispersion) or aliphatic solvent PUS (i.e., aliphatic polyurethane solution) onto a readily releasable carrier web or liner (e.g., a polyester carrier web) having a smooth surface. By using such a carrier web or liner having a smooth surface on which to apply the aliphatic aqueous PUD or aliphatic solvent PUS, the resulting aliphatic PU layer can exhibit an exposed major surface with the appearance of having been cast onto a smooth major surface of a releasable carrier web or liner, dried or otherwise cured and the carrier web removed. In contrast, if the aliphatic PU layer is open air dried or cured such as, for example, by casting or coating the aliphatic PU layer onto the one major surface of the aliphatic TPU layer, then the exposed major surface of the aliphatic PU layer would not exhibit the same smooth appearance.

The aliphatic TPU layer can be formed by extruding the polycaprolactone-based aliphatic TPU (i.e., aliphatic thermoplastic polyurethane) at an elevated temperature through an extrusion die. The aliphatic TPU layer may also be formed by casting or otherwise molding (e.g., injection molding) the polycaprolactone-based aliphatic TPU into the shape desired.

The aliphatic PU and aliphatic TPU layers can be bonded together, for example by laminating the layers at an elevated temperature and pressure. For example, one major surface of the aliphatic PU layer can be cold laminated under pressure to one major surface of the extruded aliphatic TPU layer, while at least the one major surface of the aliphatic TPU layer is, or both the aliphatic TPU layer and the aliphatic PU layer are, at an elevated temperature that is sufficiently high enough to facilitate adequate bonding between the aliphatic PU layer and the aliphatic TPU layer. To improve bonding between individual layers, corona treatment is possible. As used herein, cold laminating refers to the layers being laminated together between two nip surfaces in about a room or ambient temperature environment (i.e., the layers are not kept in an intentionally heated environment during the laminating process). The nip surfaces may be two nip rollers, a stationary nip surface (e.g., a low friction surface of a flat or curved plate) and a nip roller, or two stationary nip surfaces. The laminating process may even be performed in a below ambient temperature environment (i.e., the layers are intentionally cooled during the laminating process). For example, one or both of the nip surfaces can be chilled to a temperature below ambient temperature, in order to cool the exposed major surfaces of the polyurethane layers (i.e., the major surfaces the nip surfaces contact). The use of such chilled surfaces can eliminate, or at least help reduce, warping of the layers resulting from the laminating process. At the same time, the major surfaces that make contact at the interface between the polyurethane layers remain at the elevated temperature long enough to be sufficiently bonded together by the laminating pressure exerted by the nip surfaces. Such cold laminating can be accomplished by laminating the newly extruded aliphatic TPU layer directly onto a preformed aliphatic PU layer, while the aliphatic TPU material still retains significant heat from the extrusion process. The aliphatic PU layer is typically still releasably bonded to the carrier web or liner, to provide additional structural strength.

Alternatively, one major surface of the aliphatic PU layer can also be bonded to one major surface of the extruded aliphatic TPU layer by using a hot laminating process. With this process, the initial temperature of both the aliphatic PU layer and the aliphatic TPU layer is about room temperature or at least a temperature that is too low to facilitate adequate bonding between the aliphatic PU layer and the aliphatic TPU layer. Then, at least the one major surface of the aliphatic TPU layer, at least the one major surface of the aliphatic PU layer, or the one major surfaces of both the aliphatic PU layer and the aliphatic TPU layer are heated to an elevated temperature that is sufficiently higher than room temperature to facilitate adequate bonding between the aliphatic PU layer and the aliphatic TPU layer under the laminating pressure. With the hot laminating process, the layers are heated before or during the application of the laminating pressure. When a hot laminating process is used, a major surface of the aliphatic TPU layer is typically releasably laminated to a readily releasable carrier web or liner (e.g., a polyester carrier web) directly after the aliphatic TPU layer is extruded, in order to provide the freshly extruded aliphatic TPU layer with additional structural support.

Acceptable minimum temperatures and pressures for bonding the layers together, using either the cold or hot laminating process, have included a temperature of at least about 90° C. and a pressure of at least about 10 N/cm$^2$.

According to the present invention, the silicone-based PSA layer may be formed using conventional techniques such as, for example, by solvent solution mixture being cast or otherwise coated directly onto the aliphatic TPU layer, or alternatively onto a releasable carrier web or liner.

To facilitate or at least improve bonding between the aliphatic PU layer, the aliphatic TPU layer and the silicone-based PSA layer it can be desirable to corona treat (e.g., air or $N_2$ corona treatment) and thermally laminate the major surface of the extruded aliphatic TPU layer to be bonded to the silicone-based PSA layer. To accomplish this, the major surface of the aliphatic TPU layer, which is not in contact with the aliphatic PU layer, is exposed and then corona treated. If a hot laminating process is used (i.e., the aliphatic TPU layer is extruded onto a releasable carrier web or liner), the carrier web or liner must first be stripped off of the aliphatic TPU layer.

Referring to FIG. 1, an exemplary multilayer film (10), in accordance with the principles of the present invention, includes at least a first or aliphatic PU layer (12), a second or aliphatic TPU layer (14) and a third or silicone-based PSA layer (16). An optional releasable carrier web or liner (18) can be releasably bonded so as to protect the surface of the aliphatic PU layer (12). It is desirable for the film (10) to also include another release liner (20) releasably bonded so as to protect the silicone-based PSA layer (16).

The following three examples describe the manufacturing process of highly weathering resistant multi-layer protective films:

Example 1

Protective Film System Comprising of (a) an Aliphatic TPU Based Base Film, (b) an Aliphatic PU Based Self-Heal Top-Coat and (c) an Silicone Based Pressure Sensitive Adhesive Layer a) Aliphatic TPU—aliphatic thermoplastic caprolactone-based polyurethane (provided by BASF) was extruded to a thickness of 150 microns onto a polyester carrier web and cooled to room temperature.

b) Aliphatic selfheal polyurethane—An aqueous aliphatic polyurethane dispersion was prepared by mixing 29.0 g of an aliphatic hydroxyl-functional polycarbonate ester-polyurethane dispersion (Bayhydrol® U XP 2750 from Bayer MaterialScience), 27.7 g of aqueous hydroxyl-functional polyester-polyurethane dispersion (Bayhydrol® U XP 2755 from Bayer MaterialScience), 1.4 g non-ionic defoaming surfactant (EnviroGem® AD 01 available from Air Products GmbH, Germany), 0.1 g of a polyether siloxane copolymer (Tego® flow 425 from Evonik Industries AG), 24.7 g of deionized water, 0.2 g of a rheology modifier (Tafigel® PUR 45 available from Münzig Chemie GmbH), 0.2 g of a rheology modifier (Tafigel® PUR 61 available from Münzig Chemie GmbH). The dispersion was mixed with a mixture of 13.4 g hydrophilic aliphatic polyisocyanate (Bayhydrur® XP 2655 from Bayer MaterialScience) and 3.3 g methoxypropylacetate (available from Alfa Aesar GmbH & Co KG). The Dispersion was coated with a doctors blade to a thickness of about 50 microns onto an A4 sheet of the aliphatic TPU from example 1 (a). The dispersion was dried and cured in an oven for 3 minutes at 140° C. The resulting material was an aliphatic selfheal optical clear polyurethane coating on an aliphatic TPU.

c) Silicone pressure sensitive adhesive—A silicone pressure sensitive adhesive was prepared by mixing 10 g silicone (DOW CORNING® 7651 Adhesive from Dow Corning), 0.1 g silicone crosslinker (Syl-Off® 7682 from Dow Corning) followed by addition and mixing with 0.12 g organic silane as anchorange additive (Syl-Off® 9176 from Dow Corning) completed by mixing with 0.16 g platinum catalyst (Syl-Off® 4000 from Dow Corning). The silicone pressure sensitive adhesive was coated with a doctors blade to a thickness of about 50 microns onto an A4 sheet of the aliphatic TPU from example 1 (a) that had been already been coated and cured at the opposite side with the aliphatic PU coating from example 1 (b). The coated A4 sheet was dried and cured in an oven at 140° C. After 5 minutes the sheet was removed and placed at the lab bench for cooling.

Example 2

Protective Film System Comprising of (a) an Aliphatic TPU Based Base Film, (b) an Aliphatic TPU Based Extrusion Coating with Physical and/or Chemical Characteristics being Different from (a) and (c) an Silicone Based Pressure Sensitive Adhesive Layer a) Aliphatic TPU based base film—aliphatic thermoplastic caprolactone-based polyurethane (provided by BASF) was extruded to a thickness of 150 microns onto a polyester carrier web directly followed by an inline extrusion coating.

b) Aliphatic TPU based extrusion coating—the aliphatic TPU (provided by BASF) based extrusion coating was applied in-line directly after the extrusion of the first TPU base film. A Corona treatment prior to the extrusion coating showed positive results in terms of film adhesion. The extrusion coating was extruded to a thickness of 50 um. The resulting product was coiled, slit and finally cut to A4 samples for further coating tests in the lab.

c) Silicone pressure sensitive adhesive—A silicone pressure sensitive adhesive was prepared by mixing 10 g silicone (DOW CORNING® 7651 Adhesive from Dow Corning), 0.1 g silicone crosslinker (Syl-Off® 7682 from Dow Corning) followed by addition and mixing with 0.12 g organic silane as anchorange additive (Syl-Off® 9176 from Dow Corning) completed by mixing with 0.16 g platinum catalyst (Syl-Off® 4000 from Dow Corning). The silicone pressure sensitive adhesive was coated with a doctors blade to a thickness of about 50 microns onto an A4 sheet of the aliphatic TPU from example 2 (a) that had already been extrusion coated at the opposite side with the aliphatic TPU coating from example 2 (b). The coated A4 sheet was dried and cured in an oven at 140° C. After 5 minutes the sheet was removed and placed at the lab bench for cooling.

Example 3

Protective Film System Comprising of a Co-Extruded Two Layer Aliphatic TPU Based Base Film (a), Consisting of Two Different Aliphatic TPU Layers (a1) and (a2), with Layer (a1) Having Different Physical and/or Chemical Characteristics and being Different from (a2), Further (c) an Silicone Based Pressure Sensitive Adhesive Layer a) Co-Extruded two layer aliphatic TPU based base film—two different aliphatic thermoplastic caprolactone-based polyurethanes (provided by BASF) were co-extruded on a co-extrusion line, consisting of two single extruders joint by a co-extrusion-block, to a thickness of 200 microns onto a polyester carrier web. The resulting product was coiled, slit and finally cut to A4 samples for further coating tests in the lab.

b) Silicone pressure sensitive adhesive—A silicone pressure sensitive adhesive was prepared by mixing 10 g silicone (DOW CORNING® 7651 Adhesive from Dow Corning), 0.1 g silicone crosslinker (Syl-Off® 7682 from Dow Corning) followed by addition and mixing with 0.06 g organic silane as anchorage additive (Syl-Off® 9176 from Dow Corning) completed by mixing with 0.16 g platinum catalyst (Syl-Off® 4000 from Dow Corning). The silicone pressure sensitive adhesive was coated with a doctors blade to a thickness of about 50 microns onto an A4 sheet of the co-extruded two layer aliphatic TPU from example 3 (a). The coated A4 sheet was dried and cured in an oven at 140° C. After 5 minutes the sheet was removed and placed at the lab bench for cooling.

The invention claimed is:

1. A multilayer protective film comprising:
a first layer comprising at least one aliphatic polyurethane, said at least one aliphatic polyurethane being a polycaprolactone-based thermoplastic aliphatic polyurethane, or at least one thermoplastic aliphatic polyurethane, said at least one thermoplastic aliphatic polyurethane being a polycaprolactone-based polyurethane, a polyester-based polyurethane, a polyether-based polyurethane, or a combination thereof;
a second layer comprising at least one thermoplastic aliphatic polyurethane, said at least one thermoplastic aliphatic polyurethane being a polycaprolactone-based polyurethane, a polyester-based polyurethane, a polyether-based polyurethane, or a combination thereof, said second layer having different physical and/or chemical properties than the first layer of thermoplastic aliphatic polyurethane; and
a pressure sensitive adhesive (PSA) layer comprising at least one pressure sensitive silicone adhesive,
wherein said first layer is bonded to one major surface of said second layer and said PSA layer is bonded to an opposite major surface of said second layer such that said second layer is sandwiched between said first layer and said PSA layer, wherein said at least one aliphatic polyurethane is the reaction product of at least one aliphatic polyol and at least one aliphatic diisocyanate, and said at least one aliphatic polyol is a polyester polyol, a polyether polyol, a polycaprolactone polyol, or a combination thereof.

2. The film according to claim 1, wherein said at least one aliphatic polyurethane is the reaction product of said at least one aliphatic polyol and a mixture of at least one aliphatic diisocyanate and at least one aliphatic triisocyanate.

3. The film according to claim 1, wherein said at least one aliphatic diisocyanate comprises isophorone diisocyanate.

4. The film according to claim 1, wherein said at least one aliphatic diisocyanate comprises bis (4-isocyanato-cyclohexyl) methane.

5. The film according to claim 1, wherein said at least one aliphatic polyurethane is a crosslinked polyurethane.

6. The film according to claim 1, wherein said at least one aliphatic polyurethane is a water-based polyurethane.

7. The film according to claim 1, wherein said at least one aliphatic polyurethane is a solvent-based polyurethane.

8. The film according to claim 1, wherein said film is transparent.

9. The film according to claim 1, wherein said film is sized and shaped to conform to a surface of an article.

10. An article having a surface protected by said multilayer protective film according to claim 9.

11. A mobile electronics display protector or an industrial touch screen protector comprising a multilayer protective film, wherein the multilayer protective film comprises:
a first layer comprising at least one aliphatic polyurethane, said at least one aliphatic polyurethane being a polycaprolactone-based thermoplastic aliphatic polyurethane, or at least one thermoplastic aliphatic polyurethane, said at least one thermoplastic aliphatic polyurethane being a polycaprolactone-based polyurethane, a polyester-based polyurethane, a polyether-based polyurethane, or a combination thereof;
a second layer comprising at least one thermoplastic aliphatic polyurethane, said at least one thermoplastic aliphatic polyurethane being a polycaprolactone-based polyurethane, a polyester-based polyurethane, a polyether-based polyurethane, or a combination thereof, said second layer having different physical and/or chemical properties than the first layer of thermoplastic aliphatic polyurethane; and
a pressure sensitive adhesive (PSA) layer comprising at least one pressure sensitive silicone adhesive,
wherein said first layer is bonded to one major surface of said second layer and said PSA layer is bonded to an opposite major surface of said second layer such that said second layer is sandwiched between said first layer and said PSA layer, wherein said at least one aliphatic polyurethane is the reaction product of at least one aliphatic polyol and at least one aliphatic diisocyanate, and said at least one aliphatic polyol is a polyester polyol, a polyether polyol, a polycaprolactone polyol, or a combination thereof.

* * * * *

UNITED STATES PATENT AND TRADEMARK OFFICE
CERTIFICATE OF CORRECTION

PATENT NO. : 11,260,631 B2
APPLICATION NO. : 15/142695
DATED : March 1, 2022
INVENTOR(S) : Buenger et al.

Page 1 of 1

It is certified that error appears in the above-identified patent and that said Letters Patent is hereby corrected as shown below:

On the Title Page

Item (30) "Foreign Application Priority Data: Apr. 30, 2015 (EP)..................15166010" should read --Foreign Application Priority Data: Apr. 30, 2015 (EP)...................15166010.7--

Signed and Sealed this
Nineteenth Day of April, 2022

Katherine Kelly Vidal
*Director of the United States Patent and Trademark Office*